US008931685B2

(12) United States Patent
Kataoka

(10) Patent No.: US 8,931,685 B2
(45) Date of Patent: Jan. 13, 2015

(54) ELECTRIC WIRE CONNECTING METHOD

(71) Applicant: Yazaki Corporation, Minato-ku, Tokyo (JP)

(72) Inventor: Masayuki Kataoka, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/143,160

(22) Filed: Dec. 30, 2013

(65) Prior Publication Data

US 2014/0110459 A1 Apr. 24, 2014

Related U.S. Application Data

(63) Continuation of application No. PCT/JP2012/068900, filed on Jul. 19, 2012.

(30) Foreign Application Priority Data

Jul. 20, 2011 (JP) ................................ 2011-159123

(51) Int. Cl.

| | |
|---|---|
| ***B23K 31/02*** | (2006.01) |
| ***H01R 43/02*** | (2006.01) |
| ***H01R 4/02*** | (2006.01) |
| ***H01R 4/62*** | (2006.01) |

(52) U.S. Cl.

CPC ............ *H01R 43/0207* (2013.01); *H01R 4/021* (2013.01); *H01R 4/625* (2013.01)

USPC .................................... 228/110.1; 228/180.5

(58) Field of Classification Search

None

See application file for complete search history.

(56) References Cited

U.S. PATENT DOCUMENTS

| | | | | |
|---|---|---|---|---|
| 3,717,842 | A * | 2/1973 | Douglas, Jr. | 29/860 |
| 5,423,474 | A * | 6/1995 | Kanagawa et al. | 228/110.1 |
| 5,493,069 | A * | 2/1996 | Conti | 174/94 R |
| 5,642,852 | A * | 7/1997 | Suzuki et al. | 228/110.1 |
| 5,906,044 | A * | 5/1999 | Fujii et al. | 29/860 |
| 6,089,438 | A * | 7/2000 | Suzuki et al. | 228/1.1 |
| 6,184,471 | B1 * | 2/2001 | Asakura et al. | 174/78 |
| 8,047,420 | B2 * | 11/2011 | Stroh | 228/110.1 |
| 2002/0130159 | A1 * | 9/2002 | Kondo | 228/110.1 |
| 2003/0098332 | A1 * | 5/2003 | Loprire | 228/110.1 |
| 2003/0226823 | A1 * | 12/2003 | Fujimoto et al. | 219/56.1 |
| 2004/0088857 | A1 * | 5/2004 | Fujimoto et al. | 29/871 |

(Continued)

FOREIGN PATENT DOCUMENTS

| | | |
|---|---|---|
| EP | 1 429 419 A1 | 6/2004 |
| FR | 2 918 808 A1 | 1/2009 |

(Continued)

OTHER PUBLICATIONS

International Search Report dated Nov. 7, 2012 issued in International Application No. PCT/JP2012/068900 (PCT/ISA/210).

(Continued)

*Primary Examiner* — Kiley Stoner

(74) *Attorney, Agent, or Firm* — Sughrue Mion, PLLC

(57) ABSTRACT

An electric wire connecting method for connecting together a wire having a conductor and a stranded wire having a plurality of strands which are twisted, the electric wire connecting method is provided. The electric wire connecting method includes a forming step and a welding step. In the forming step, the conductor is formed into a plate element by pressing the conductor. In the welding step, the strands are welded to the plate element in a state where the strands are superposed on the plate element.

4 Claims, 6 Drawing Sheets

(56) References Cited

U.S. PATENT DOCUMENTS

| | | | | |
|---|---|---|---|---|
| 2006/0169742 | A1* | 8/2006 | Fujimoto et al. | 228/4.5 |
| 2008/0128471 | A1* | 6/2008 | Eberbach et al. | 228/1.1 |
| 2009/0218134 | A1* | 9/2009 | Stroh et al. | 174/74 R |
| 2010/0003867 | A1* | 1/2010 | Lehmann et al. | 439/874 |
| 2010/0170935 | A1* | 7/2010 | Stroh et al. | 228/110.1 |
| 2011/0042444 | A1* | 2/2011 | Ohnuma | 228/110.1 |
| 2011/0048762 | A1* | 3/2011 | Sawamura | 174/78 |
| 2011/0062218 | A1* | 3/2011 | Ohnuma | 228/110.1 |
| 2011/0155701 | A1* | 6/2011 | Gerst et al. | 219/117.1 |
| 2011/0198122 | A1* | 8/2011 | Sagawa et al. | 174/84 R |
| 2012/0298645 | A1* | 11/2012 | Kleespiess et al. | 219/137 R |
| 2013/0193193 | A1* | 8/2013 | Nikkhoo | 228/110.1 |
| 2013/0293045 | A1* | 11/2013 | Kajita et al. | 310/71 |

FOREIGN PATENT DOCUMENTS

| | | | | |
|---|---|---|---|---|
| JP | 5-94860 | A | | 4/1993 |
| JP | 2010-113946 | A | * | 5/2010 |
| JP | WO 2012/077281 | A1 | * | 6/2012 |
| WO | 2006/084995 | A2 | | 8/2006 |
| WO | 2006/084995 | A3 | | 8/2006 |

OTHER PUBLICATIONS

Written Opinion dated Nov. 7, 2012 issued in International Application No. PCT/JP2012/068900 (PCT/ISA/237).

* cited by examiner

ELECTRIC WIRE CONNECTING METHOD

CROSS REFERENCE TO RELATED APPLICATIONS

This application is a continuation of PCT application No. PCT/JP2012/068900, which was filed on Jul. 19, 2012 based on Japanese Patent Application (No. 2011-159123) filed on Jul. 20, 2011, the contents of which are incorporated herein by reference.

BACKGROUND OF THE INVENTION

1. Field of the Invention

The present invention relates to an electric wire connecting method for connecting together conductors of electric wires for establishing an electric communication therebetween.

2. Description of the Related Art

For example, in wiring harnesses which are laid in a motor vehicle, electric wires of the wiring harnesses are connected together to distribute circuits. As a connecting method for connecting together electric wires of such wiring harnesses, there is known a connecting method for crimp connecting the electric wires by use of a sleeve (for example, refer to PTL 1).

[PTL 1] JP-A-5-94860

SUMMARY OF THE INVENTION

Incidentally, in wiring harnesses, plural electric wires of which conductors are made of different materials need to be connected together. There is a situation in which for example, a stranded wire having copper strands is connected to a rod wire of aluminum. The rod wire has a single core wire which has a rounded section. The stranded wire has a plurality of strands which are twisted. When these electric wires are connected tighter by a sleeve, there is a situation in which an existing sleeve cannot be appropriated. Because of this, various types of sleeves need to be prepared according to diameters of electric wires to be connected, and this calls for complicated connecting work and increased production costs.

It is therefore one advantageous aspect of the present invention to provide an electric wire connecting method by which conductor of a rod wire and strands of a stranded wire can be connected together easily and stably without calling for an increase in production costs.

According to one advantage of the invention, there is provided an electric wire connecting method for connecting together a wire having a conductor and a stranded wire having a plurality of strands which are twisted, the electric wire connecting method comprising:

forming the conductor into a plate element by pressing the conductor; and welding the strands to the plate element in a state where the strands are superposed on the plate element.

In the welding, the strands may be welded to the plate element through ultrasonic welding.

The plate element may have an arc shape in section orthogonal to an extending direction of the wire.

In the electric wire connecting method, the conductor of the wire may be pressed together with the strands of the stranded wire with a die in the forming, and the strands and the plate element may be welded together through ultrasonic welding by ultrasonically vibrating the die in the welding.

In the electric wire connecting method configured as described above, since the conductor of the wire is pressed to be formed into the plate element, the strands of the stranded wire can easily be superposed on the conductor of the wire so that the conductor and the strands can be welded together. By adopting this configuration, the necessity of an additional part such as a sleeve or a connector for use in connecting the electric wires together can be obviated. Consequently, the conductor of the wire and the strands of the stranded wire can be connected together easily and stably without calling for an increase in production costs, and hence, the reliability in connection can be enhanced.

In the electric wire connecting method configured as described above, even in the event that, for example, the conductor of the wire is made of aluminum and the strands of the stranded wire are made of copper or a copper alloy, these conductor and the strands can be welded together through ultrasonic welding without utilizing any additional equipment.

In the electric wire connecting method configured as described above, by superposing the strands of the stranded wire on an arc-shaped inner side of the conductor of the wire which is formed into the plate element having the arc shape in section and welding the strands to the conductor, the conductor of the wire and the strands of the stranded wire can be welded together easily and stably.

In the electric wire connecting method configured as described above, the forming step and the welding step can be simplified, thereby making it possible to increase the welding work efficiency largely.

According to the invention, the electric wire connecting method can be provided by which the conductor of the rod wire and the strands of the stranded wire can be connected together easily and stably without calling for the increase in production costs.

Thus, the invention has been described briefly. Further, the details of the invention will be clarified further by perusing the following description of a mode for carrying out the invention by reference to the accompanying drawings.

BRIEF DESCRIPTION OF THE DRAWINGS

FIG. 2A is a perspective view of the rod wire, and FIG. 2B is a front view of an end portion of the rod wire.

FIG. 3A is a perspective view of the stranded wire, and FIG. 3B is a front view of an end portion of the stranded wire.

DETAILED DESCRIPTION OF THE EXEMPLARY EMBODIMENTS

Hereinafter, an embodiment of the invention will be described by reference to the drawings.

Figure 1:
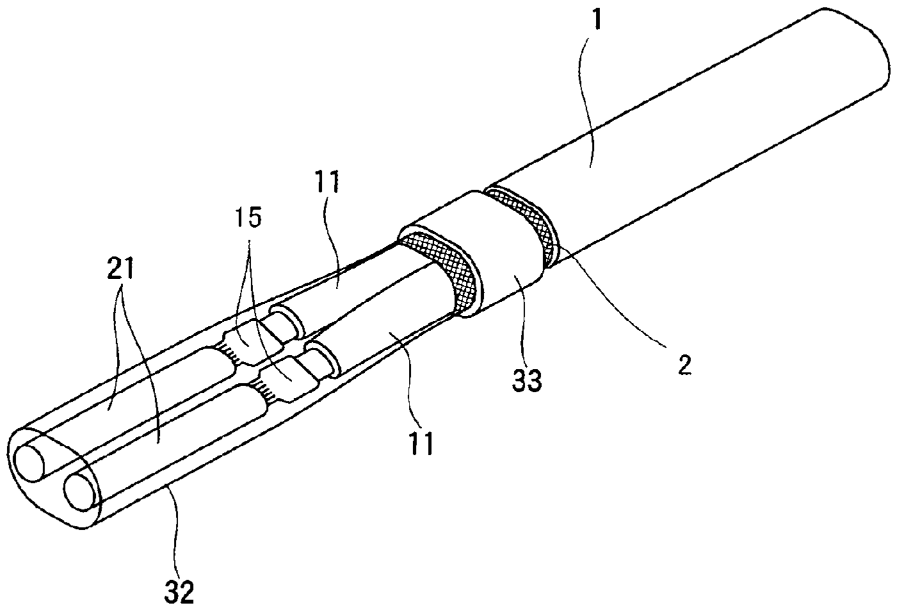
FIG. 1 is a perspective view of a portion where electric wires are connected together by use of an electric wire connecting method according to an embodiment of the invention.

In an electric wire connecting method according to this embodiment, as shown in FIG. 1, rod wires (a wire) 11 and stranded wires 21 are connected together.

Figure 2A:
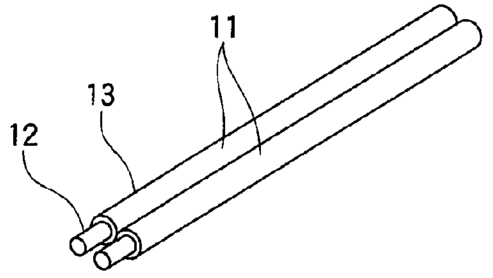
FIGS. 2A and 2B show diagrams depicting a rod wire.
Figure 2B:
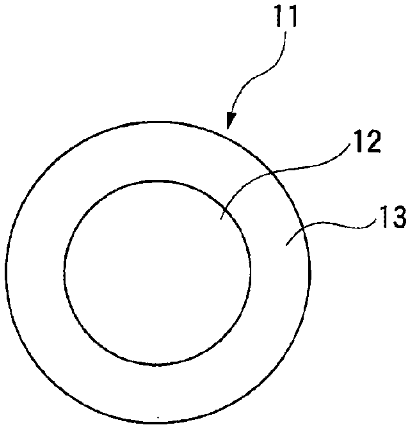

As shown in FIGS. 2A and 2B, one rod wire 11 has one conductor 12 made of aluminum and a skin 13 made of synthetic resin which is provided around the conductor 12 so as to cover it. In FIGS. 1 to 2B, two rod wires 11 are shown as being aligned side by side. The rod wires 11 are configured as conductors of a cabtyre cable 1, and the rod wires 11 are covered therearound by a braided shield 2.

Figure 3A:
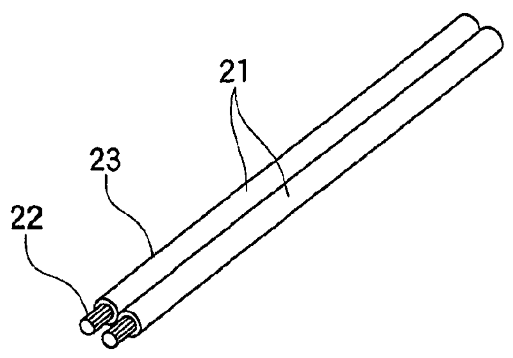
FIGS. 3A and 3B show diagrams depicting a stranded wire.
Figure 3B:
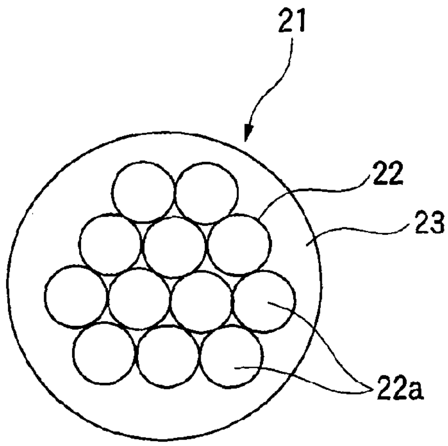

As shown in FIGS. 3A and 3B, one stranded wire 21 has a conductor 22 into which plural strands 22*a* each made of copper or a copper alloy are twisted and a skin 23 made of synthetic resin which is provided around the conductor 22 so as to cover it. In FIG. 3, two stranded wires 21 are shown as being aligned side by side.

The conductors 12, 22 of the rod wire 11 and the stranded wire 21 are exposed at end portions thereof, and the exposed conductors 12, 22 are connected to each other. A portion 15 where the rod wire 11 and the stranded wire 21 are connected together is covered by a shield tube 32 which is made up of a braid or foil. In FIG. 1, the shield tube 32 is shown as being transparent so that the construction covered thereby becomes visible. The shield tube 32 which covers the wire connected portion 15 where end portions of the pair of rod wires 11 are welded to end portions of the pair of stranded wires 21 extends towards the cabtyre cable 1, and an end portion of the shield tube 32 which is situated to face the cabtyre cable 1 is superposed on the braided shield 2 which is provided around the rod wires 11 to cover them. A portion where the shield tube 32 and the brained shield are superposed on and under is crimped by a cylindrical member 33 to attain an electric communication.

Next, the connection of the conductor 12 of the rod wire 11 and the conductor 22 of the stranded wire 21 in the way described above will be described.

Figure 4:
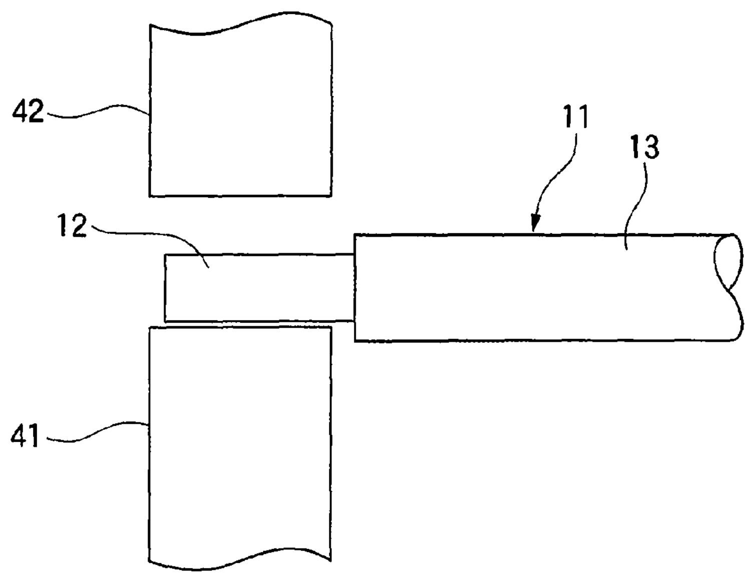
FIG. 4 is a side view illustrating a forming step.
Figure 5:
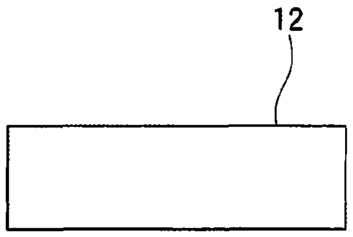
FIG. 5 is a front view of a conductor of the rod wire which is formed into a plate element in the forming step.

Firstly, the conductor 12 of the rod wire 11 is formed. Specifically, as shown in FIG. 4, the conductor 12 of aluminum which is exposed from the skin 13 is pressed by a lower die 41 and an upper die 42 of a press so that the conductor 12 is formed into a flat plate (a plate element) shown in FIG. 5.

Figure 6:
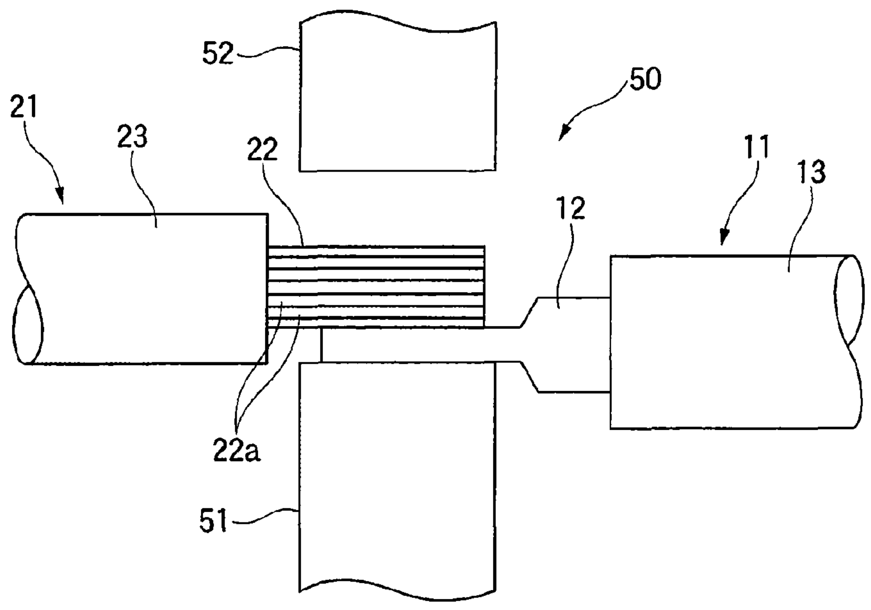
FIG. 6 is a side view illustrating a welding step.

Next, the conductor 12 of the rod wire 11 and the conductor 22 of the stranded wire 21 are welded together through ultrasonic welding. Specifically, as shown in FIG. 6, the conductor 22 of the stranded wire 21 is superposed on the conductor 12 of the rod wire 11 which is formed into the flat plate element, and the conductor superposed portion is set in an ultrasonic welding machine 50. This ultrasonic welding machine 50 has a horn 51 which is ultrasonically vibrated by an ultrasonic oscillator (not shown) and an anvil 52 which is disposed above the horn 51 so as to be raised or lowered as required. The conductor 12 of the rod wire 11 and the conductor 22 the stranded wire 21 which are superposed one on the other are disposed between the horn 51 and the anvil 52.

When the anvil 52 is lowered in this state, the superposed conductors 12, 22 are held by the horn 51 and the anvil 52 therebetween. As this occurs, since the conductor 12 of the rod wire 11 is pressed to be formed into the flat plate element in advance, there is caused no such situation that the conductor 22 of the stranded wire 21 is dislocated from the conductor 12 of the rod wire 11, and hence, the superposed conductors 12, 22 are held by the horn 51 and the anvil 52 therebetween.

Figure 7:
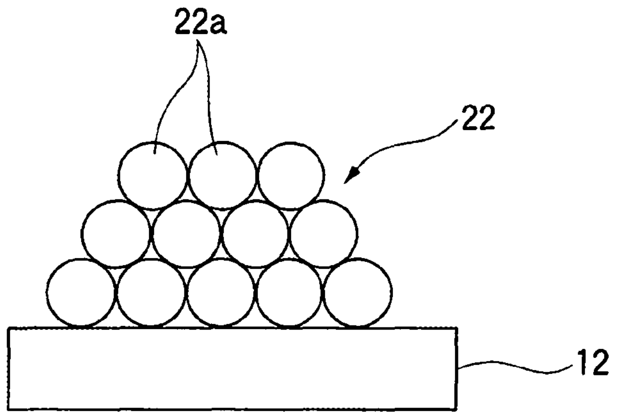
FIG. 7 is a sectional view depicting the conductor and the strands which are welded to each other.

Then, after the conductors 12, 22 are held by the horn 51 and the anvil 52 therebetween in this way, the horn 51 is ultrasonically vibrated by the ultrasonic oscillator. By so doing, as shown in FIG. 7, the conductor 12 of the rod wire 11 and the conductor 22 of the stranded wire 21 are welded together through ultrasonic welding.

Thereafter, the shield tube 32 is placed around the wire connected portion 15 so as to protect the conductor welded portion. In placing the shield tube 32, it is considered to adopt a method of winding a shield tube material circumferentially around the wire connected portion 15 to place the shield tube 32 therearound or a method of inserting an end portion of the cabtyre cable 1 which is situated opposite to the wire connected portions 15 of the rod wires 11 or opposite end portions of the stranded wires 21 to the wire connected portions 15 of the stranded wires 21 into an inside of the shield tube 32 which is formed into the cylindrical shape.

In this way, according to the electric wire connecting method of the embodiment, since the conductor 12 of the rod wire 11 is pressed to be formed into the plate element, the conductor 22 of the stranded wire 21 can easily be superposed on the conductor 12 of the rod wire 11 so that the conductors of both the wires can easily be welded together. By so doing, the necessity of an additional part such as a sleeve or a connector for use in connecting the conductors together can be obviated. Consequently, the conductors 12, 22 of the rod wire 11 and the stranded wire 21 can be connected together easily and stably without calling for an increase in production costs, and hence, the reliability in connection can be enhanced.

Additionally, the respective conductors 12, 22 are welded together through ultrasonic welding, even in the event that the conductor 12 of the rod wire 11 is made of aluminum, while the conductor 22 of the stranded wire 21 is made of copper or a copper alloy, the conductors 12, 22 thereof can be welded together through ultrasonic welding in an ensured fashion without utilizing any additional equipment.

In this embodiment, while the conductor 12 of the rod wire 11 is formed into the flat plate element in the forming step, the shape of the conductor 12 to be formed is not limited to the flat plate-like shape but may be of any shape, provided that the conductor 22 of the stranded wire 21 can be superposed on the conductor 12 in a stable fashion.

Figure 8:
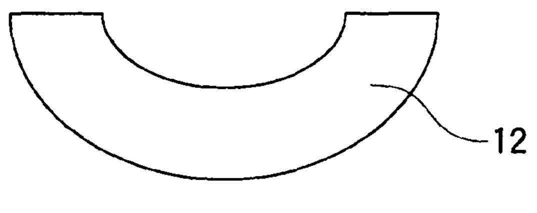
FIG. 8 is a front view of a conductor of a rod wire which is formed to have an arc shape in section.

For example, as shown in FIG. 8, the conductor 12 of the rod wire 11 may be pressed to be formed into a plate element having an arc shape in section. The plate element may have an arc shape in section orthogonal to an extending direction of the rod wire.

Figure 9:
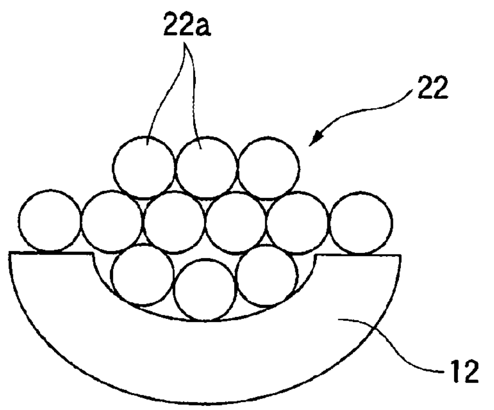
FIG. 9 is a sectional view depicting the conductor and the strands which are welded to each other.

In this way, with the conductor 12 formed into the plate element having the arc shape in section, when the conductor 12 is disposed so that a side which is depressed in an arc-like fashion in section of the conductor 12 is oriented upwards and the conductor 22 of the stranded wire 21 is disposed on the conductor 12, part of the conductor 21 enters the arc-like depression in the conductor 12 as shown in FIG. 9, and consequently, the superposed state of the conductors 12, 22 can be stabilized further, whereby the ultrasonic welding of the conductors by the ultrasonic welding machine 50 can be facilitated further.

In addition, in the embodiment, while the forming step and the welding step are executed separately, these steps may be executed simultaneously.

Specifically, the lower die 41 of the press is used as a horn, while the upper die 42 of the press is used as an anvil. Then, the conductors 12, 22 of the rod wire 11 and the stranded wire 21 are disposed between the lower die 41 and the upper die 42 so as to press the conductors 12, 22 by the lower die 41 and the upper die 42. Then, the lower die 41 is ultrasonically vibrated by the ultrasonic oscillator in that state. By so doing, the conductor 12 of the rod wire 11 and the conductor 22 of the stranded wire 21 are welded together through ultrasonic welding. Then, when the forming step and the welding step are executed simultaneously in the way described above, the simplification of the forming step and the welding step can be attained, thereby making it possible to enhance the welding work efficiency largely.

In this case, the conductor 12 of the rod wire 11 may be formed into the plate element having the arc shape in section. When the conductor 12 is formed into the plate element having the arc shape in section in the way described above, the welding of the conductors 12, 22 can be stabilized.

Here, comparison examples will be shown here to describe further the superiority of the invention thereover.

Figure 10:
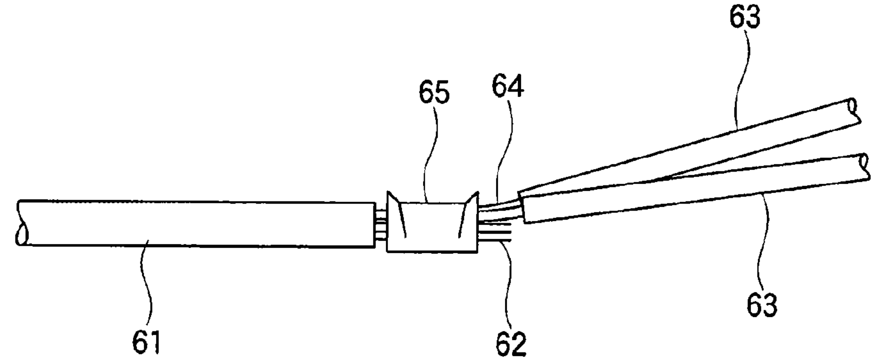
FIG. 10 is a side view of a portion where electric wires are connected together which illustrates an electric wire connecting method according to a comparison example.

In a comparison example shown in FIG. 10, conductors 64 of rod wires 63 are press joined fixedly to a conductor 62 of a stranded wire 61 by a metallic sleeve 65 through crimping.

According to this connecting method, the sleeve 65 used has to be sized to correspond to a diameter resulting from diameters of the conductors to be connected together, and crimpers of different sizes have to be prepared to cope with sleeves 65 of different sizes.

Figure 11:
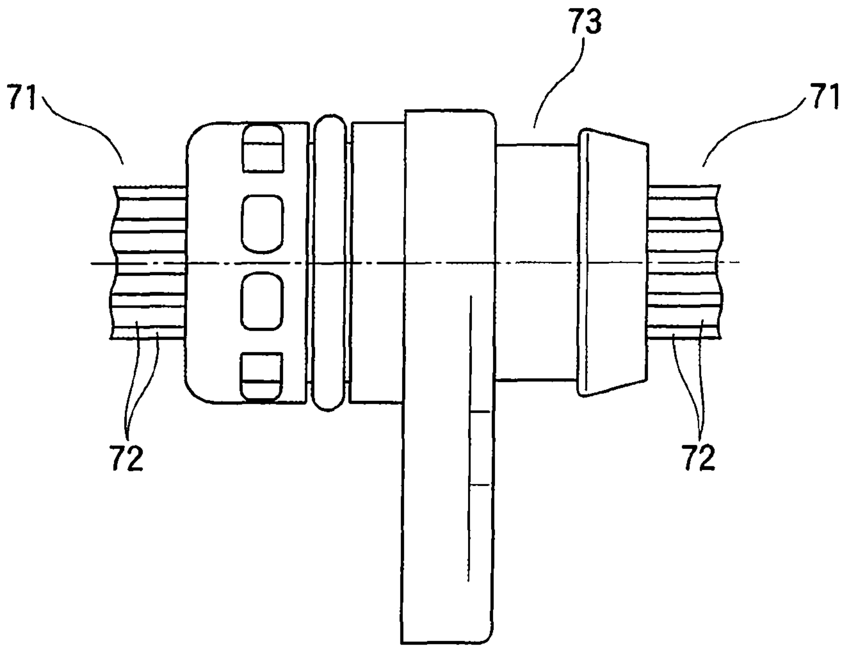
FIG. 11 is a side view of a portion where electric wires are connected together which illustrates an electric wire connecting method according to another comparison example.

In addition, in a comparison example shown in FIG. 11, conductors 72 of wiring harnesses 71 are connected to each other by a joint connector 73.

In this connecting method, conductor connecting terminals which are provided inside the joint connector 73 cannot be used commonly on rod wires and stranded wires, and therefore, exclusive connecting terminals which can be connected both to the rod wires and the stranded wires have to be prepared.

Because of these drawbacks, the connecting methods shown in FIGS. 10 and 11 eventually call for complicated connecting work and increased production costs.

The above-mentioned embodiment is merely a typical example of the present invention, and the present invention is not limited to the embodiment. That is, the present invention can be variously modified and implemented without departing from the essential features of the present invention.

The present invention is useful for providing an electric wire connecting method by which conductor of a rod wire and strands of a stranded wire can be connected together easily and stably without calling for an increase in production costs.

What is claimed is:

1. An electric wire connecting method for connecting together a rod wire having a conductor and a stranded wire having a plurality of strands which are twisted, the electric wire connecting method comprising:

forming the conductor of the rod wire into a plate element by pressing the conductor together with the plurality of strands of the stranded wire with a die; and welding the plurality of strands of the stranded wire to the plate element in a state where the strands are superposed on the plate element.

2. The electric wire connecting method as set forth in claim 1, wherein in the welding, the strands are welded to the plate element through ultrasonic welding.

3. The electric wire connecting method as set forth in claim 1, wherein the plate element has an arc shape in section orthogonal to an extending direction of the wire.

4. The electric wire connecting method as set forth in claim 1, wherein in the welding, the strands and the plate element are welded together through ultrasonic welding by ultrasonically vibrating the die.

* * * * *